(12) United States Patent
Jess

(10) Patent No.: US 8,527,720 B2
(45) Date of Patent: Sep. 3, 2013

(54) METHODS OF CAPTURING AND NAMING DYNAMIC STORAGE TIERING CONFIGURATIONS TO SUPPORT DATA PRE-STAGING

(75) Inventor: Martin Jess, Erie, CO (US)

(73) Assignee: LSI Corporation, San Jose, CA (US)

( * ) Notice: Subject to any disclaimer, the term of this patent is extended or adjusted under 35 U.S.C. 154(b) by 458 days.

(21) Appl. No.: 12/315,400

(22) Filed: Dec. 3, 2008

(65) Prior Publication Data

US 2010/0138620 A1 Jun. 3, 2010

(51) Int. Cl.
*G06F 12/00* (2006.01)
*G06F 13/00* (2006.01)
*G06F 13/28* (2006.01)

(52) U.S. Cl.
USPC ............................ 711/162; 711/114; 711/161

(58) Field of Classification Search
None
See application file for complete search history.

(56) References Cited

U.S. PATENT DOCUMENTS

| 7,383,381 B1 | 6/2008 | Faulkner et al. | |
| 2002/0112134 A1* | 8/2002 | Ohran et al. | 711/162 |
| 2003/0140207 A1 | 7/2003 | Nagase et al. | |
| 2006/0010169 A1 | 1/2006 | Kitamura | |
| 2006/0069862 A1* | 3/2006 | Kano | 711/114 |
| 2006/0224642 A1* | 10/2006 | Chandhok et al. | 707/204 |
| 2008/0028143 A1 | 1/2008 | Murase | |
| 2008/0080131 A1 | 4/2008 | Hori et al. | |
| 2008/0082748 A1 | 4/2008 | Liu et al. | |
| 2008/0104350 A1 | 5/2008 | Shimizu et al. | |
| 2008/0126773 A1 | 5/2008 | Martinez et al. | |
| 2008/0270719 A1* | 10/2008 | Cochran et al. | 711/162 |

FOREIGN PATENT DOCUMENTS

| JP | 2003216460 | 7/2003 |
| JP | 2008084254 | 4/2008 |
| JP | 2008090352 | 4/2008 |
| JP | 2008112276 | 5/2008 |

* cited by examiner

*Primary Examiner* — Yaima Campos
(74) *Attorney, Agent, or Firm* — Suiter Swantz pc llo

(57) ABSTRACT

A method for pre-staging data includes obtaining a DST configuration of a virtual volume at a first point in time. The method also includes creating a Point-in-Time copy (PiT) in a destination storage pool when the virtual volume includes at least one PiT, or reconfiguring at least one virtual volume segment to contain a hot-spot. The virtual volume may or may not have PiTs. The method further includes recording the DST configuration, specifying the DST configuration be applied to the storage array at a second point in time, and applying the DST configuration to the storage array at the second point in time.

16 Claims, 4 Drawing Sheets

US 8,527,720 B2

METHODS OF CAPTURING AND NAMING DYNAMIC STORAGE TIERING CONFIGURATIONS TO SUPPORT DATA PRE-STAGING

TECHNICAL FIELD

The present disclosure generally relates to the field of storage systems, and more particularly to methods for pre-staging data based on captured dynamic storage tiering configurations.

BACKGROUND

A storage system may group storage devices into tiers based on various characteristics, including performance, cost, and the like. Data may be stored in the grouped storage devices to utilize specific capabilities of the storage devices. Such grouping may be referred to as storage tiering or storage tiers. A storage array may comprise multiple storage tiers with significantly difference performance characteristics. For instance, higher performing storage tiers typically include relatively expensive storage devices such as Solid State Drives (SSDs), whereas lower performing storage tiers typically include relatively cheap storage devices such as Serial ATA (SATA) Hard Disk Drives (HDDs). A user may prefer the higher performing storage tiers to contain data with a high load/activity, whereas the remaining data may be stored in the lower performing storage tiers.

SUMMARY

A method for pre-staging data includes obtaining a DST configuration of a virtual volume at a first point in time. The virtual volume being provisioned from at least one storage pool of a storage array. The method also includes creating a Point-in-Time copy (PiT) in a destination storage pool when the virtual volume includes at least one PiT, or reconfiguring at least one virtual volume segment to contain a hot-spot. The at least one virtual volume segment configured to be moved to at least one corresponding storage pool. The method further includes recording the DST configuration, specifying the DST configuration be applied to the storage array at a second point in time, and applying the DST configuration to the storage array at the second point in time.

A method for capturing and naming DST configurations to support data pre-staging includes provisioning a virtual volume from at least one storage pool of a storage array, designating at least one virtual volume segment of the virtual volume for mapping a virtual volume range to a virtual drive range, identifying at least one hot-spot in the virtual volume, recording at least one Dynamic Storage Tiering (DST) configuration, applying the at least one DST configuration to the storage array, verifying the validity of the at least one DST configuration, and pre-staging data according to the at least one DST configuration prior to at least one of a peak production period or an off-peak production period.

A computer-readable medium having computer-executable instructions for performing a method for pre-staging data includes provisioning a virtual volume from at least one storage pool of a storage array, designating at least one virtual volume segment of the virtual volume for mapping a virtual volume range to a virtual drive range, identifying at least one hot-spot in the virtual volume, recording at least one Dynamic Storage Tiering (DST) configuration, applying the at least one DST configuration to the storage array, verifying the validity of the, at least one DST configuration, and pre-staging data according to the at least one DST configuration prior to at least one of a peak production period or an off-peak production period.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1A:
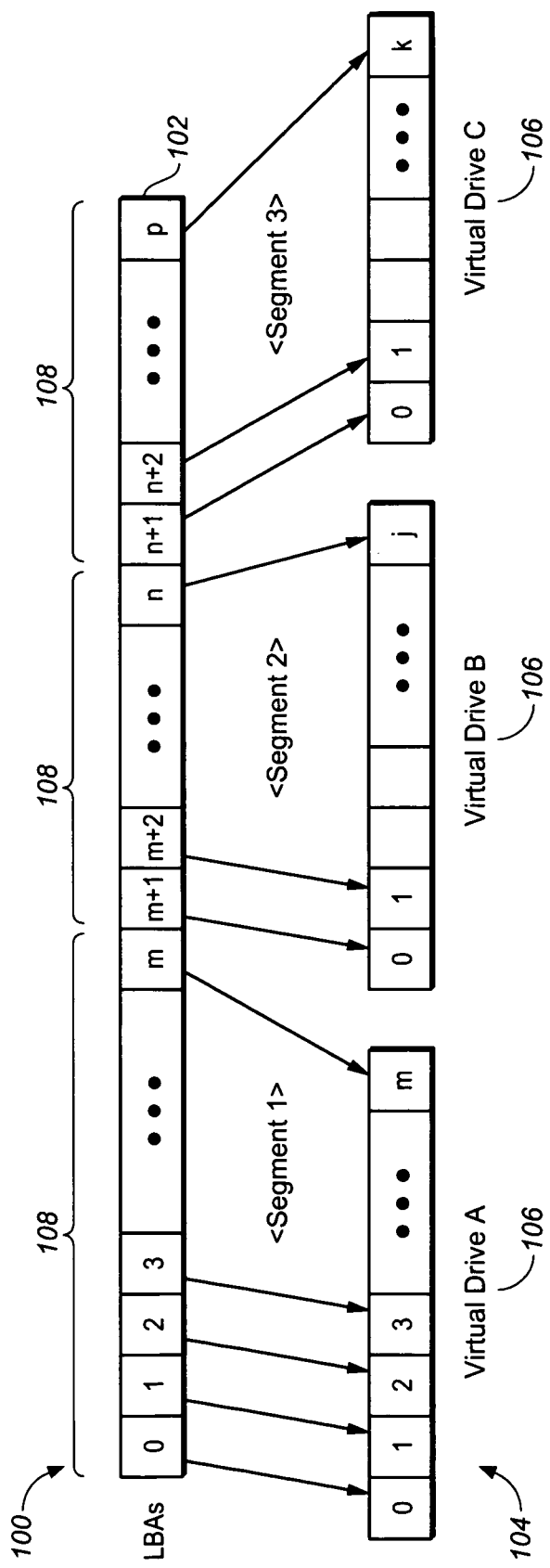
FIG. 1A displays a block diagram of a virtual volume segmentation of a storage array.
Figure 1B:
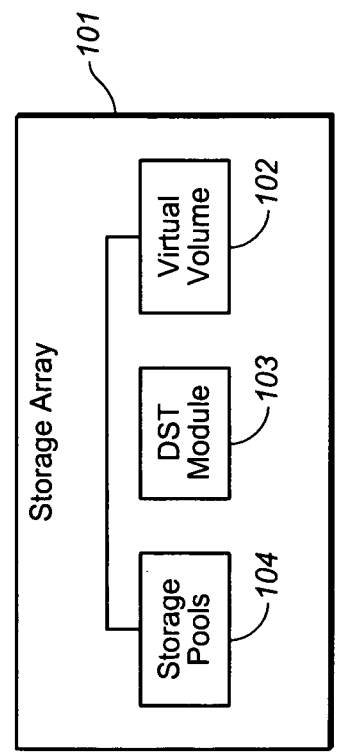
FIG. 1B displays a block diagram of a storage array.

Referring to FIGS. 1A and 1B, a block diagram of a virtual volume segmentation 100 of a storage array and a block diagram of a storage array 101 are displayed. In a storage array, a host visible small computer system interface (SCSI) Logical Unit (LU) may be mapped to a virtual volume 102, for instance, when a storage virtualization manager (SVM) is deployed in the storage array. Virtual volume 102 may be derived from a capacity of one or more storage pools 104 in the storage array 101. The one or more storage pools 104 may correspond to a storage tier of the storage array 101. Storage pools 104 may include one or more virtual drives 106. In a particular embodiment, virtual drives 106 correspond to redundant array of independent disks (RAID) volumes. When virtual volume 102 is derived from storage pools 104, a virtual volume segment 108 is created for each mapping of a virtual volume logical block address (LBA) range to a virtual drive LBA range. It is appreciated that any number of virtual volume segments 108 may be utilized to map virtual volume 102 to virtual drives 106, thus the depiction of three virtual volume segments 108 in FIG. 1 is not limiting. The grouping of virtual volume segments 108 of virtual volume 102 may be referred to as a virtual volume segment configuration.

Figure 2:
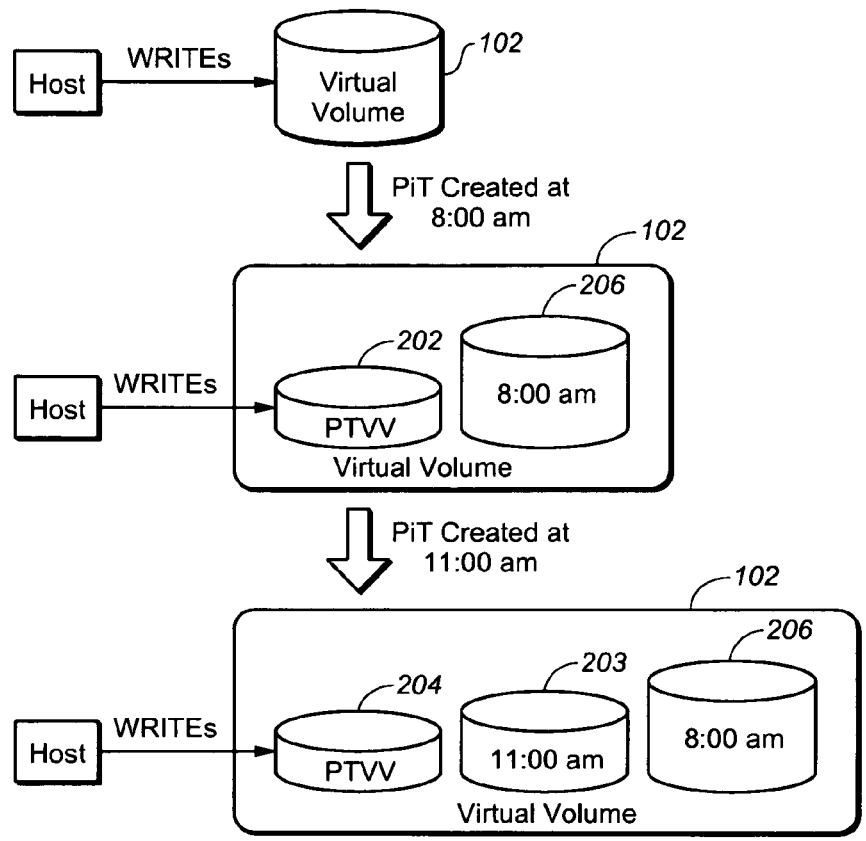
FIG. 2 displays a block diagram of Point-in-Time copies (PiTs) created for a virtual volume.
Figure 4:
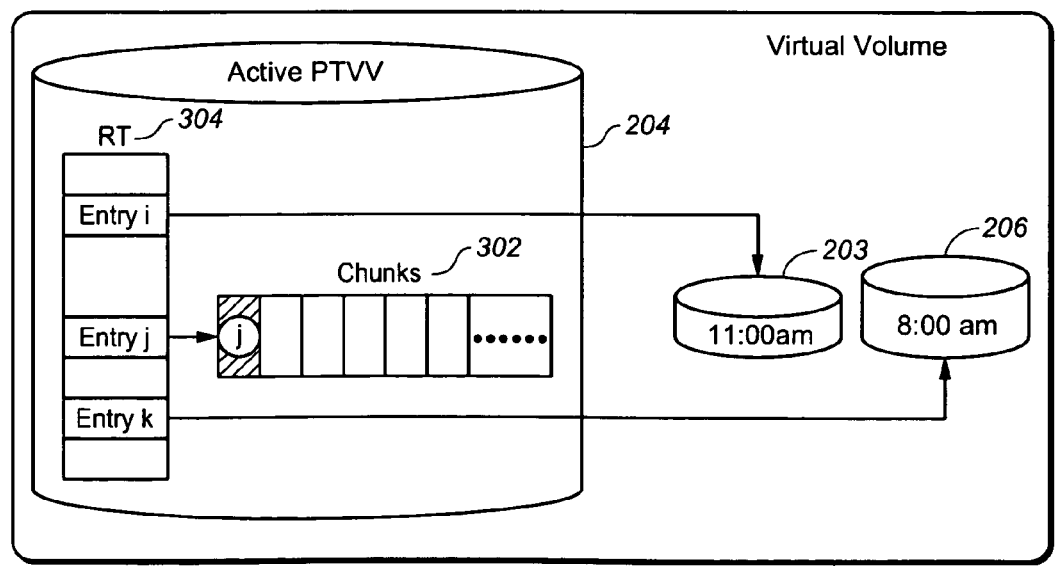
FIG. 4 displays a block diagram of a virtual volume with an active PiT Temporary Virtual Volume (PTVV)
Figure 3:
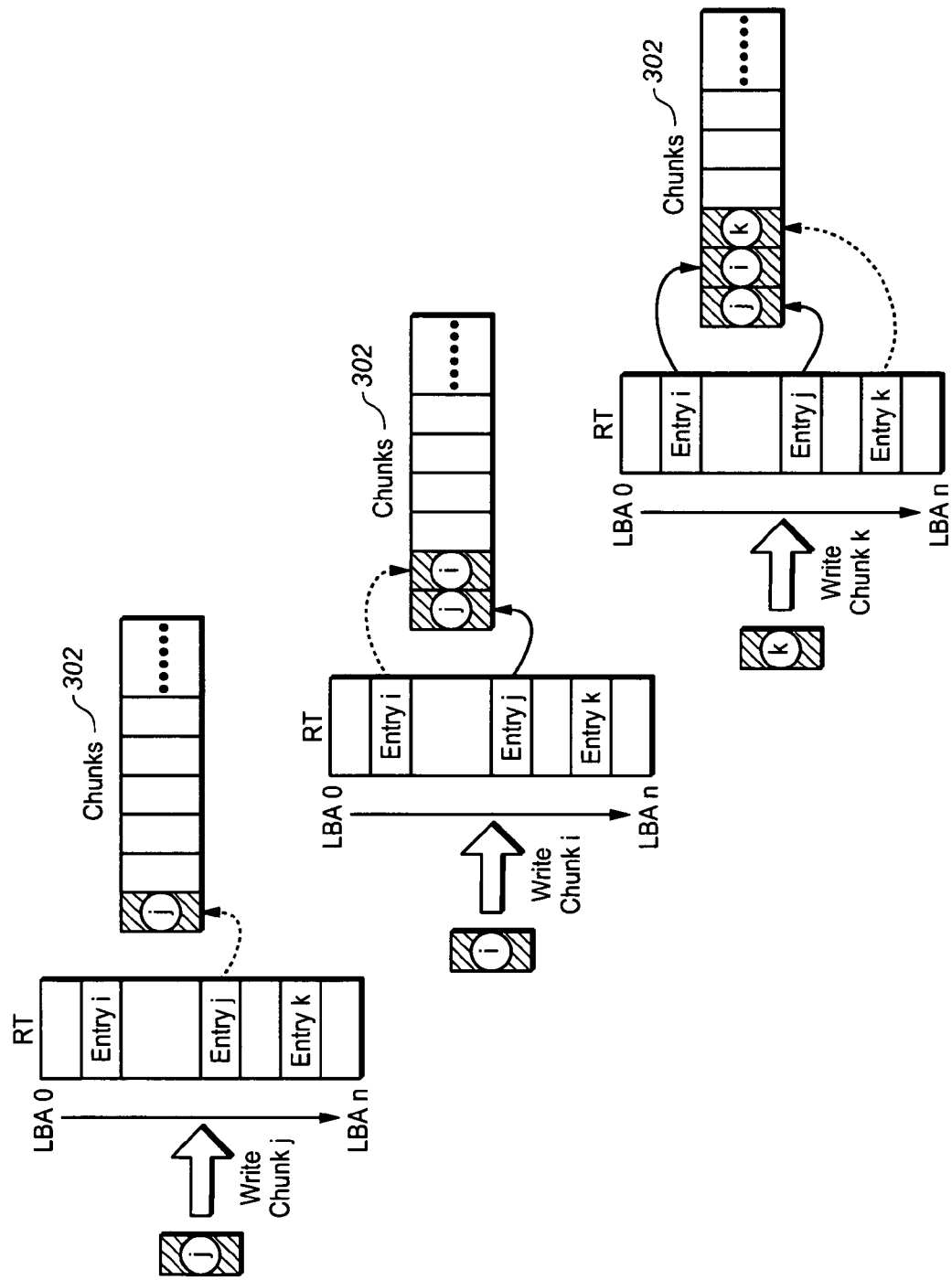
FIG. 3 displays a block diagram of a virtual volume Logical Block Address (LBA) conceptually divided into chunks.

Referring generally to FIGS. 2-4, the SVM may support a snapshot mechanism where one or more PiTs can be created for a virtual volume, such as virtual volume 102. Virtual volume 102 may or may not have a PiT, which determines whether virtual volume segments are reconfigured to contain a hot-spot and moved to a destination storage pool (in the case where virtual volume 102 has no PiT), or whether a new PiT is created in the destination storage pool (in the case where virtual volume 102 has a PiT). The snapshot mechanism may be referred to as allocate-on-write snapshots. The allocate-on-write snapshots approach may also be referred to as redirect-on-write snapshots. When a PiT is created on virtual volume 102, the virtual volume 102 is frozen and a PiT Temporary Virtual Volume (PTVV) 202 is created. The PTVV 202 may hold all changes made to virtual volume 102 after the PiT was taken. Thus, the original contents of the virtual volume may be preserved at the time the PiT was created. If another PiT is created, the current PTVV 202 may be frozen and a new PTVV 204 may be created. In FIG. 2, the first PiT is created at 8:00 am, which freezes the contents of the original virtual volume 206. The second PiT is created at 11:00 am, which freezes the PTVV for the first PiT, depicted by reference character 203. The most recent PiT may be referred to as an active PiT, due to all writes going to the PTVV 204 of the active PiT.

The virtual volume LBA range may be conceptually divided into a plurality of chunks 302. In one embodiment, each chunk 302 comprises an equivalent size. The size of a chunk 302 may be the PiT granularity, which is an attribute of the virtual volume. Thus, each chunk 302 may correspond to an LBA range of size PiT granularity within the original virtual volume 102. A re-allocation table (RT) 304 may be created for each PiT. The RT 304 may be stored in the beginning of the PTVV. Further, the re-allocation table 304 may contain an entry for each chunk 302 in the virtual volume 102. When a chunk 302 is written by a host after the PiT was created, the corresponding entry may be marked "allocated" and the chunk may be placed in the PTVV at the next available LBA, such as shown in FIG. 3. The chunks 302 placed in the PTVV may not be consecutive LBAs, rather, the chunks may be placed in the order they are written (e.g., the order in FIG. 3 is: j, i, k). Thus, the chunks may not be ordered in the PTVV according to the LBA ranges that the chunks represent.

When a PiT is deleted, the chunks in the corresponding PTVV may be reintegrated into the previous PiT, or into the virtual volume itself, such as when no more PiTs are present.

When a read operation is received on a virtual volume, the RT 304 for the active PiT may point to the most recent version of the chunk 302, which may also be referred to as a valid chunk. The RT may point to the valid chunk in one or more of: the PTVV for the active PiT, a PTW for an older PiT, or the original virtual volume 102. As shown in FIG. 4, chunk j was written to the Active PTW 204 (i.e., the 11:00 am PTVV). Chunk i was most recently written (while the 8:00 am PTVV was active). Chunk k was written to the original virtual volume before the 8:00 am PiT was created, and has not been written since.

Referring generally to FIGS. 1-4, a Dynamic Storage Tiering (DST) module 103 of the storage array 101 may be used to dynamically move data to optimal storage tiers as loads on the storage array 101 vary throughout a given period. For example, as specific data are accessed frequently during peak periods, the DST module 103 may move the data to higher performing storage tiers. As the load decreases after the peak period (i.e., during a non-peak period), the DST module 103 may move the data back to lower performing storage tiers. Further, the DST module 103 may identify performance hot-spots (e.g., data experiencing high loads/activity) in virtual volume 102 and reconfigure virtual volume segments 108 to ensure each performance hot-spot is contained in one or more virtual volume segments 108. The virtual volume segments 108 may then be moved to appropriate corresponding storage pools 104 when the virtual volume 102 does not have any PiTs. If the virtual volume 102 has one or more PiTs, the DST module 103 may create a PiT in a destination/target storage pool. For read hot-spots (i.e., hot-spots where the majority of I/O operations are reads), the DST module 103 may still create a new PiT in the destination storage pool, and may also perform the additional step of copying the LBA range comprising the read hot-spot to the new PTVV in the destination storage pool. This may place all the chunks corresponding to the hot-spot in the PTVV in the destination storage pool. As reads are received on the hot-spot in the virtual volume, they may now go to the chunks in the PTVV in the destination storage pool (which may be a higher-performing destination).

Once an optimal virtual volume segment configuration or PiT configuration has been achieved for a particular load on the storage array 101, the optimal DST configuration may be captured and named, such as through a storage array management interface. The term "DST configuration" includes either a virtual volume segment configuration (in the case where the original virtual volume 102 in the DST set does not have a PiT) or one or more PiTs (in the case where the original virtual volume 102 in the DST set has a PiT). For example, a user may capture/record and name any number of optimal DST configurations, for instance, a user may capture and name an optimal DST configuration during a peak period, and subsequently capture and name an optimal DST configuration during a non-peak period. Alternatively, the storage array may be configured to automatically capture/record and name optimal DST configurations, such as, for example, periodically or at set times.

A captured (or recorded) and named configuration may be applied to the storage array 101. A virtual volume segment 108 may then be moved to the corresponding storage pool 104 storing the particular virtual volume segment 108 prior to the named configuration capture, or a PiT may be created in a particular storage pool 104 in the case where the virtual volume 102 has PiTs. The storage array 101 may verify the validity of the named configuration before applying the named configuration. For instance, the named configuration may be deemed valid if (i) virtual volume 100 (or a plurality of virtual volumes, if applicable) in the named configuration exists, (ii) virtual volume 100 (or the plurality of virtual volumes, if applicable) in the named configuration have the same DST configuration as when the named configuration was recorded, (iii) all storage pools 104 in the named configuration exist, (iv) whether the virtual volume included a PiT when the optimal configuration was obtained, (v) determining whether the virtual volume includes at least one PiT (such as if the virtual volume included a PiT) at the time of the verification (i.e., whether the virtual volume currently includes at least one PiT), and (vi) all storage pools 104 in the named configuration have sufficient free capacity to contain the corresponding virtual volume segments 108 or PiTs. When determining whether the virtual volume includes at least one PiT, the verification may be successful even if the virtual volume does not include the same PiTs or even the same number of PiTs as the virtual volume included when the optimal configuration was obtained. This verification may be successful if the virtual volume includes one or more PiTs.

By capturing and naming DST configurations, data may be pre-staged, that is, a named configuration may be preemptively applied to the storage array 101 prior to a certain period of time, such as, for example, a peak period for data loads. Thus virtual volume segments 108 or PiTs may be arranged to contain the performance hot-spots prior to the period when data loads increase, thereby avoiding delays caused by the DST module 103 during peak periods. Similarly, data may be pre-staged prior to a non-peak period, such as, for example, to transfer data to lower performing storage tiers.

In a particular embodiment of the present disclosure, data may be pre-staged according to a predictable cycle, such as prior to expected or anticipated periods of peak data loads. For instance, the predictable cycle may be implemented daily, weekly, bimonthly, monthly, quarterly, semi-annually, annually, or according to any other cycle, according to user needs. Alternatively, data may be pre-staged according to a custom-set schedule.

Upon applying a named configuration, a user may specify or the storage array 101 may implement a delay period after which the DST module 103 may be re-enabled. For instance, during the delay period, the DST module 103 may not be enabled, and thus will not attempt to reconfigure the virtual volume segments 108 to contain varying hot-spots. Thus, the delay period may enable the pre-staging of data prior to a peak period or a non-peak period without the DST module 103 nullifying the pre-staging process. In one exemplary embodiment, data is pre-staged prior to a peak period of data load on the storage array 101, such as by using a named configuration captured during a previous peak period, and a delay period is included that is set to begin upon application of the DST configuration and set to terminate after the peak period has begun, thereby enabling the DST module 103 only after the peak period has begun.

The present disclosure is described below with reference to flowchart illustrations of methods. It will be understood that each block of the flowchart illustrations and/or combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart. These computer program instructions may also be stored in a computer-readable tangible medium (thus comprising a computer program product) that can direct a computer or other programmable data processing apparatus to function in a particular manner, such that the instructions stored in the computer-readable tangible medium produce an article of manufacture including instruction means which implement the function/act specified in the flowchart.

Figure 5:
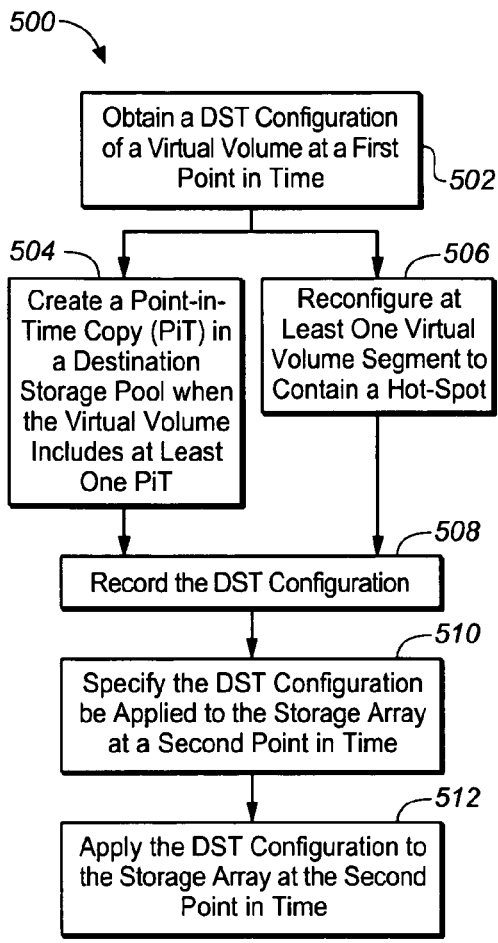
FIG. 5 is a flow chart illustrating a method for capturing and naming dynamic storage tiering (DST) configurations to support data pre-staging.

Referring now to FIG. 5, a flow chart is displayed illustrating a method 500 for capturing and naming DST configurations to support data pre-staging, in accordance with an embodiment of the present disclosure. Method 500 may obtain a DST configuration of a virtual volume at a first point in time, 502. The virtual volume may be provisioned from at least one storage pool of a storage array. The first point in time may occur within one of a peak period or a non-peak period. Method 500 may create a Point-in-Time copy (PiT) in a destination storage pool when the virtual volume includes at least one PiT, 504. Or, when the virtual volume does not include at least one PiT, Method 500 may reconfigure at least one virtual volume segment to contain a hot-spot, 506. The at least one virtual volume segment may be configured to be moved to at least one corresponding storage pool. Method 500 may record the DST configuration, 508. Method 500 may specify the DST configuration be applied to the storage array at a second point in time, 510. Method 500 may apply the DST configuration to the storage array at the second point in time, 512.

Further, method 500 may specify a period of time after the second point in time during which a second DST configuration is obtained and recorded. Method 500 may specify the second DST configuration be applied to the storage array at a third point in time, and apply the second DST configuration to the storage array at the third point in time. Method 500 may verify the validity of the DST configuration. Verifying the validity of the DST configuration may include at least one of: determining whether the virtual volume in the DST configuration exists, or determining whether the virtual volume in the DST configuration includes the same configuration of the at least one virtual volume segment. Verifying the validity of the DST configuration may also include at least one of: determining whether the at least one corresponding storage pool in the DST configuration exists, determining whether the virtual volume included a PiT when the DST configuration was obtained, determining whether the virtual volume includes at least one PiT, or determining whether the at least one corresponding storage pool in the optimal configuration includes free capacity sufficient to contain at least one of the at least one virtual volume segment or a PiT.

Figure 6:
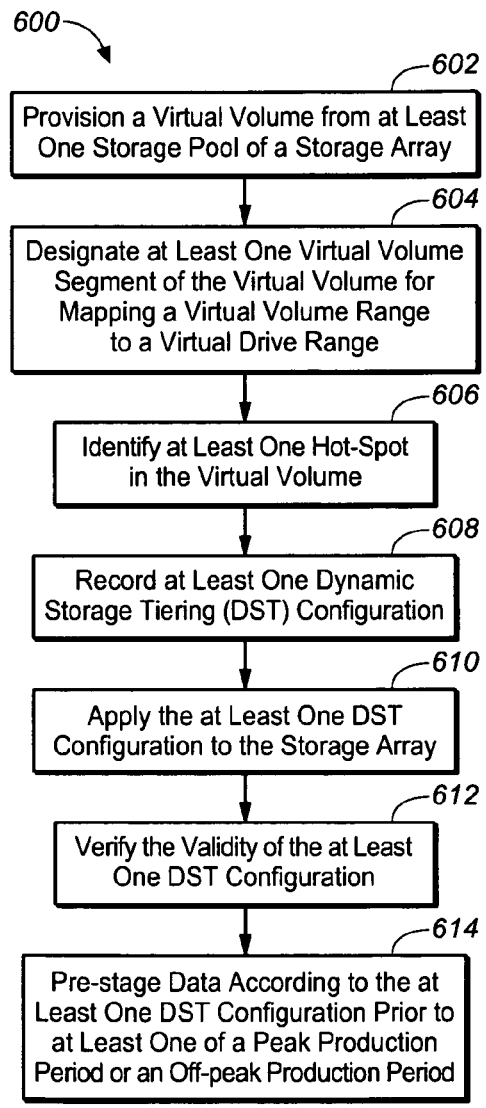
FIG. 6 is a flow chart illustrating a further embodiment of a method for capturing and naming DST configurations to support data pre-staging.

Referring now to FIG. 6, a flow chart is displayed illustrating a method 600 for capturing and naming DST configurations to support data pre-staging, in accordance with an alternative embodiment of the present disclosure. Method 600 may provision a virtual volume from at least one storage pool of a storage array 602. Method 600 may designate at least one virtual volume segment of the virtual volume for mapping a virtual volume range to a virtual drive range 604. Method 600 may identify at least one hot-spot in the virtual volume 606. Method 600 may record at least one Dynamic Storage Tiering (DST) configuration 608. Method 600 may apply the at least one DST configuration to the storage array 610. Method 600 may verify the validity of the at least one DST configuration 612. Method 600 may pre-stage data according to the at least one DST configuration prior to at least one of a peak production period or an off-peak production period 614.

Identifying at least one hot-spot in the virtual volume of method 600 may further include at least one of reconfiguring the at least one virtual volume segment to contain the hot-spot; or creating a Point-in-Time copy (PiT) in a destination storage pool. For instance, if a PiT is not present in the virtual volume, identifying at least one hotspot in the virtual volume may include reconfiguring the at least one virtual volume segment to contain the hot-spot. Whereas if a PiT is present in the virtual volume, identifying at least one hotspot in the virtual volume may include creating a Point-in-Time copy (PiT) in a destination storage pool.

Verifying the validity of the at least one DST configuration of method 600 may include at least one of determining whether the virtual volumes in the recorded DST configuration exist or determining whether the virtual volumes in the recorded DST configuration include the same segment configuration as recorded and named in the step of recording at least one DST configuration. Verifying the validity of the at least one DST configuration may include at least one of determining whether the at least one storage pool in the recorded DST configuration exists, determining whether the virtual volume included a PiT when the optimal configuration was obtained, determining whether the virtual volume includes at least one PiT, or determining whether the at least one storage pool in the recorded DST configuration includes free capacity sufficient to contain the at least one of a virtual volume segment or a PiT.

The step of pre-staging data prior to at least one of a peak production period or an off-peak production period of method 600 may include including a delay period to be initiated upon application of the at least one DST configuration to the storage array, wherein after the delay period, a DST module is enabled. Method 600 may further comprise at least one of transferring the at least one virtual volume segment to a corresponding storage pool when the virtual volume lacks a PiT or creating a PiT in a target storage pool when the virtual volume includes at least one PiT. The step of pre-staging data prior to at least one of a peak production period or an off-peak production period of method 600 may be repeated according to a predictable cycle, the predictable cycle being at least one of daily, weekly, bi-monthly, monthly, quarterly, semi-annually, or annually.

In the present disclosure, the methods disclosed may be implemented as sets of instructions or software readable by a device. Such a software package may be a computer program product which employs a computer-readable storage medium including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
    obtaining a Dynamic Storage Tiering (DST) configuration of a virtual volume at a first point in time, the virtual volume being provisioned from at least one storage pool of a storage array, the first point in time being in a period of peak data load;
    creating a Point-in-Time copy (PiT) in a destination storage pool when the virtual volume includes at least one PiT;
    creating a PiT temporary virtual volume (PTVV) in the virtual volume, the PTVV configured to store changes made to the virtual volume since the PiT of the virtual volume was created to preserve a copy of the virtual volume that existed prior to changes made to the virtual volume since the PiT of the virtual volume was created;
    reconfiguring at least one virtual volume segment to contain a hot-spot when the virtual volume does not include at least one PiT, the at least one virtual volume segment configured to be moved to at least one corresponding storage pool;
    determining whether the virtual volume included at least one PiT when the DST configuration was obtained;
    recording the DST configuration when it is determined that the virtual volume included at least one PiT when the DST configuration was obtained;
    specifying the DST configuration be applied to the storage array at a second point in time, the second point in time occurring prior to a second period of peak data load;
    applying the DST configuration to the storage array at the second point in time; and
    including a delay period to be initiated upon application of the DST configuration to the storage array at the second point in time, wherein during the delay period a DST module is disabled, and wherein after the delay period, the DST module is enabled, the delay period set to terminate during the second period of peak data load.

2. The method of claim 1, further including specifying a period of time after the second point in time during which a second DST configuration is obtained and recorded.

3. The method of claim 2, further including:
    specifying the second DST configuration be applied to the storage array at a third point in time; and
    applying the second DST configuration to the storage array at the third point in time.

4. The method of claim 1, further including verifying the validity of the DST configuration.

5. The method of claim 4, wherein verifying the validity of the DST configuration includes at least one of:
    determining whether the virtual volume in the DST configuration exists; or
    determining whether the virtual volume in the DST configuration includes the same configuration of the at least one virtual volume segment.

6. The method of claim 4, wherein verifying the validity of the DST configuration includes at least one of:
    determining whether the at least one corresponding storage pool in the DST configuration exists;
    determining whether the virtual volume included a PiT when the DST configuration was obtained;
    determining whether the virtual volume includes at least one PiT; or
    determining whether the at least one corresponding storage pool in a recorded configuration includes free capacity sufficient to contain at least one of the at least one virtual volume segment or a PiT.

7. The method of claim 1, wherein the PTVV includes a re-allocation table configured to store an entry for each chunk of the virtual volume, wherein each chunk represents a conceptual division of the virtual volume.

8. The method of claim 7, wherein each chunk is placed in the re-allocation table in an order corresponding to an order in which each chunk is written by a host.

9. A method, comprising:
    provisioning a virtual volume from at least one storage pool of a storage array;
    designating at least one virtual volume segment of the virtual volume for mapping a virtual volume range to a virtual drive range;
    creating a Point-in-Time copy (PiT) in a destination storage pool when the virtual volume includes at least one PiT;
    creating a PiT temporary virtual volume (PTVV) in the virtual volume, the PTVV configured to store changes made to the virtual volume since the PiT of the virtual volume was created to preserve a copy of the virtual volume that existed prior to changes made to the virtual volume since the PiT of the virtual volume was created;
    reconfiguring at least one virtual volume segment to contain a hot-spot when the virtual volume does not include at least one PiT, the at least one virtual volume segment configured to be moved to at least one corresponding storage pool;

obtaining at least one Dynamic Storage Tiering (DST) configuration;

determining whether the virtual volume included at least one PiT when the DST configuration was obtained;

recording the at least one DST configuration when it is determined that the virtual volume included at least one PiT when the DST configuration was obtained;

applying the at least one DST configuration to the storage array;

verifying the validity of the at least one DST configuration;

pre-staging data according to the at least one DST configuration prior to at least one of a peak production period or an off-peak production period; and including a delay period to be initiated upon application of the at least one DST configuration to the storage array, wherein during the delay period a DST module is disabled, and wherein after the delay period the DST module is enabled.

10. The method of claim 9, wherein verifying the validity of the at least one DST configuration includes at least one of:
   determining whether the virtual volumes in the recorded DST configuration exist; or
   determining whether the virtual volumes in the recorded DST configuration include the same segment configuration as recorded and named in the step of recording at least one DST configuration.

11. The method of claim 9, wherein verifying the validity of the at least one DST configuration includes at least one of:
   determining whether the at least one storage pool in the recorded DST configuration exists;
   determining whether the virtual volume included a PiT when a recorded configuration was obtained;
   determining whether the virtual volume includes at least one PiT; or
   determining whether the at least one storage pool in the recorded DST configuration includes free capacity sufficient to contain the at least one of a virtual volume segment or a PiT.

12. The method of claim 9, further comprising at least one of transferring the at least one virtual volume segment to a corresponding storage pool when the virtual volume lacks a PiT or creating a PiT in a target storage pool when the virtual volume includes at least one PiT.

13. A non-transitory computer-readable medium having computer-executable instructions for performing a method for pre-staging data, said method comprising:
   provisioning a virtual volume from at least one storage pool of a storage array;
   designating at least one virtual volume segment of the virtual volume for mapping a virtual volume range to a virtual drive range;
   creating a Point-in-Time copy (PiT) in a destination storage pool when the virtual volume includes at least one PiT;
   creating a PiT temporary virtual volume (PTVV) in the virtual volume, the PTVV configured to store changes made to the virtual volume since the PiT of the virtual volume was created to preserve a copy of the virtual volume that existed prior to changes made to the virtual volume since the PiT of the virtual volume was created;
   reconfiguring at least one virtual volume segment to contain a hot-spot when the virtual volume does not include at least one PiT, the at least one virtual volume segment configured to be moved to at least one corresponding storage pool;
   obtaining at least one Dynamic Storage Tiering (DST) configuration;
   determining whether the virtual volume included at least one PiT when the DST configuration was obtained;
   recording the at least one DST configuration when it is determined that the virtual volume included at least one PiT when the DST configuration was obtained;
   applying the at least one DST configuration to the storage array;
   verifying the validity of the at least one DST configuration;
   pre-staging data according to the at least one DST configuration prior to at least one of a peak production period or an off-peak production period; and
   including a delay period to be initiated upon application of the at least one DST configuration to the storage array, wherein during the delay period a DST module is disabled, and wherein after the delay period the DST module is enabled.

14. The non-transitory computer-readable medium of claim 13, wherein verifying the validity of the at least one DST configuration includes at least one of:
   determining whether the virtual volumes in the recorded at least one DST configuration exist; or
   determining whether the virtual volumes in the recorded at least one DST configuration include the same segment configuration as recorded and named in the step of recording at least one DST configuration.

15. The non-transitory computer-readable medium of claim 13, wherein verifying the validity of the at least one DST configuration includes at least one of:
   determining whether the at least one storage pool in the recorded DST configuration exists;
   determining whether the virtual volume included a PiT when a recorded configuration was obtained;
   determining whether the virtual volume includes at least one PiT; or
   determining whether the at least one storage pool in the recorded DST configuration includes free capacity sufficient to contain the at least one of a virtual volume segment or a PiT.

16. The non-transitory computer-readable medium of claim 13, wherein the method further comprises at least one of transferring the at least one virtual volume segment to a corresponding storage pool when the virtual volume lacks a PiT or creating a PiT in a target storage pool when the virtual volume includes at least one PiT.

* * * * *